(12) United States Patent
Nitta et al.

(10) Patent No.: US 6,908,658 B2
(45) Date of Patent: Jun. 21, 2005

(54) ELECTROPHOTOGRAPHY RECORDING PAPER

(75) Inventors: Katsukuni Nitta, Tokyo (JP); Hideo Shimoda, Tokyo (JP); Tamio Shikano, Ibaraki (JP)

(73) Assignee: Yupo Corporation, Tokyo (JP)

(*) Notice: Subject to any disclaimer, the term of this patent is extended or adjusted under 35 U.S.C. 154(b) by 113 days.

(21) Appl. No.: 10/340,585

(22) Filed: Jan. 13, 2003

(65) Prior Publication Data

US 2003/0157299 A1 Aug. 21, 2003

Related U.S. Application Data

(63) Continuation-in-part of application No. PCT/JP01/05985, filed on Jul. 10, 2001.

(30) Foreign Application Priority Data

Jul. 12, 2000 (JP) .................................... P2000-211697

(51) Int. Cl.[7] ........................... B32B 3/10; B32B 27/14; B32B 27/00
(52) U.S. Cl. ...................... 428/137; 428/131; 428/354; 428/500; 428/523; 428/195
(58) Field of Search ................................ 428/137, 131, 428/354, 520, 523, 195, 323, 341, 322, 206, 212, 219, 195.1

(56) References Cited

U.S. PATENT DOCUMENTS

| 5,824,394 A | * 10/1998 | Kinoshita et al. ........ 428/195.1 |
| 5,925,446 A | 7/1999 | Matsuda et al. |
| 6,136,752 A | * 10/2000 | Paz-Pujalt et al. .......... 503/227 |

FOREIGN PATENT DOCUMENTS

| JP | 1-197763 | 8/1989 |
| JP | 9-211880 | 8/1997 |

\* cited by examiner

*Primary Examiner*—Harold Pyon
*Assistant Examiner*—Patricia L. Nordmeyer
(74) *Attorney, Agent, or Firm*—Oblon, Spivak, McClelland, Maier & Neustadt, P.C.

(57) ABSTRACT

The object of the invention is to provide an electrophotography recording paper having excellent density, color tone, gradation, fixing properties and recording qualities, while having excellent water resistance and durability. The object may be obtained by constructing an electrophotography recording paper 1 by laminating a recording layer 3 comprising a synthetic resin film having a coating layer 4 on at least one side of a base material layer 2 comprising a paper material having a water resistance. The electrostatic capacity of the electrophotography recording paper is controlled at 10 $pF/cm^2$ or more. It is desirable that the synthetic resin film as the recording layer 3 be a polyester film, particularly a polyethylene terephthalate film.

37 Claims, 2 Drawing Sheets

ELECTROPHOTOGRAPHY RECORDING PAPER

TECHNICAL FIELD

The present invention relates to an electrophotography recording paper which can effect good color recording at least on one side thereof by electrophotographic copying machines, laser printers and the like. The recording paper of the present invention, which can be preliminary printed and perforated before printing, has excellent density, color tone, gradation, fixing properties, and recording qualities, as well as having excellent fixing properties, water resistance, and durability without lamination.

BACKGROUND OF THE INVENTION

Remarkable recent advances in copying machine and printer technology have been accomplished yielding a reduction in cost in addition to enhanced recording quality, recording speed and performance. Accordingly, posters, catalogs, pamphlets and other printed matters, that were conventionally prepared by printing machines, may now be prepared using copying machines or printers more conveniently and quickly while maintaining the conventional recording quality. Particularly, recording by copying machines or printers is ideal for quickly preparing various printing tasks and small quantities of printed matters.

Among the assortment of copying machines and printers are copying machines and printers that employ an electrophotographic system. In particular, copying machines and printers that use a semiconductor laser are superior due to high resolution and high speed recording abilities. However, there are problems associated with color recording in that the apparatus becomes large in size because of the necessity to use two or more developing apparatus and the resultant color tone is slightly inferior due to the use of a pigment toner. These problems have been addressed by miniaturization of the photosensitive drum and the developing apparatus, as well as improvements in the toner and recording paper.

However, the conventional electrophotography paper on which color recording is effected by an electrophotographic copying machine, laser printer, or the like, is prepared by forming a recording layer containing a pigment comprising synthetic silica powder as the main component, an aqueous adhesive, and an ink set agent on the surface of a base material layer. The base material layer is typically composed of pulp paper, so that it is not sufficiently satisfactory yet regarding density, color tone, gradation, fixing properties, and recording qualities, as well as water resistance, and present durability.

Furthermore, when the basic material layer composed of pulp paper is printed and used as pop art, poster, restaurant's menu card, or the like, inmost cases, it is used after lamination with PET film, PP film, or the like. Thus, it has not been satisfied in terms of cost and handling. In the case of small price tag and pop art, furthermore, there is the inconvenience of printing on large-sized paper and then cutting into pieces in a desired size, followed by laminating these pieces with films. In particular, at supermarkets and mass sales stores where price tags are renewed every day, the placement of price tags and pop art posters take much times and expenses, becoming too burdensome in terms of cost and labor.

Furthermore, a paper having the basic material layer composed of pulp paper may be perforated to provide the paper with a hand-cutting property. In some cases, depending on the pitches of perforations, cut goes off the perforation line at the time of tearing off along the line, buckling is occurred at the time of printing with an electrophotographic copying machine, and the finished shape of the product is substantially lost.

The present invention has been made for the purpose of resolving these background problems, and its object is to provide an electrophotography recording paper which is suitable for color recording at least on one side thereof by electrophotographic copying machines, laser printers and the like, and which can be preliminary printed and perforated before printing, has excellent density, color tone, gradation, fixing properties, and recording qualities, and has excellent fixing properties, water resistance, and durability without lamination.

Furthermore, the above electrophotography recording paper may be punched or perforated depending on the usage dimensions in advance before printing, so that the printing can be performed on the paper having punched holes or perforations. Therefore, the paper obtains a hand-cutting property without using an edged tool or a cutting machine, so that it will provide increased productivity.

DISCLOSURE OF THE INVENTION

In order to achieve the above object, the invention provides an electrophotography recording paper in which a recording layer composed of a synthetic resin film having a coating layer is laminated on at least one side of a base material layer composed of a paper material having water resistance and which has an electrostatic capacity of 10 $pF/cm^2$ or more.

Also, the invention provides an electrophotography recording paper in which a recording layer composed of a synthetic resin film having a coating layer is laminated on the surface of a base material layer composed of a paper material having water resistance, and a protecting layer composed of a synthetic resin film on the reverse side of the base material layer, and which has an electrostatic capacity of 10 $pF/cm^2$ or more. For effecting sales advancement and the like, a printing may be applied in advance to the opposite side of the coating layer of the recording layer of the electrophotography recording paper, and a printing may also be applied in advance to the side of the base material layer where it is laminated with the recording layer.

The paper material as the base material layer may be a converted paper having water resistance or a polyolefin film containing an inorganic and/or organic fine powder.

The synthetic resin film employed as the recording layer is preferably a polyester film, particularly preferably a polyethylene terephthalate film.

Also, a bar code may be printed on the electrophotographic recording paper as occasion demands, and a pressure-sensitive adhesion processing may be applied on side of the outermost layer of the electrophotography recording paper. In addition, the recorded matter prepared by using the electrophotography recording paper of the invention can be used as catalogs, cards, insertion labels for horticulture use, pressure-sensitive adhesive labels and the like.

Figure 1:
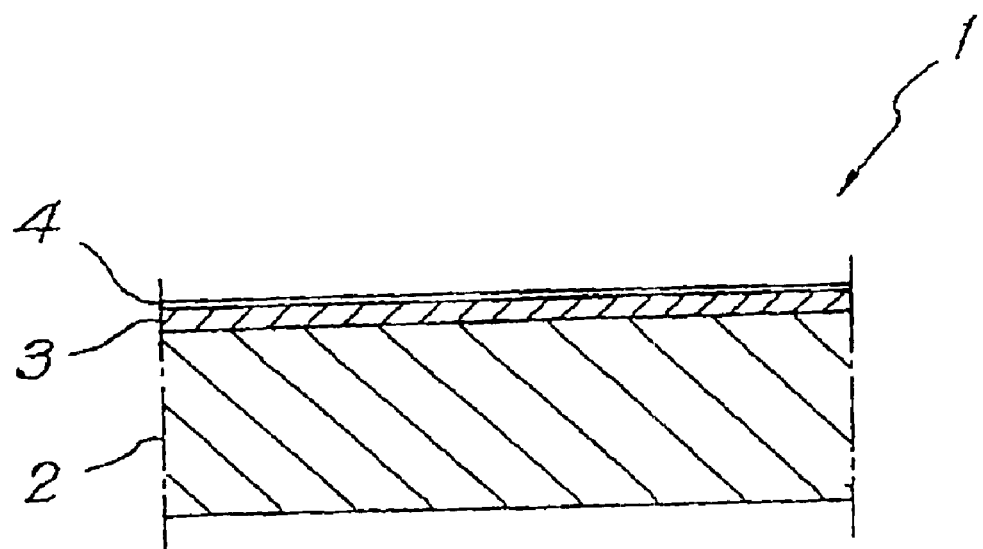
FIG. 1 is a partially expanded sectional view of an example of the electrophotography recording paper of the invention.

In this connection, regarding the reference numerals in the drawings, 1 is an electrophotography recording paper, 2 is a base material layer, 3 is a recording layer, 4 is a coating layer, 5 is a protecting layer and 11 is an electrophotography recording paper.

BEST MODE FOR CARRYING OUT THE INVENTION

The following describes suitable embodiments of the electrophotography recording paper of the invention, with reference to the drawings.

The electrophotography recording paper 1 of the invention shown in FIG. 1 is prepared by laminating a recording layer 3 comprising a synthetic resin film having water resistance and insulation performance and having a coating layer 4 on one side of a base material layer 2 comprising a paper material having water resistance.

[Base Material Layer]

As the base layer 2, a converted paper or a polyolefin film containing inorganic and/or organic fine powder, having water resistance and a thickness of from 20 to 300 µm, preferably from 50 to 150 µm, is employed.

Those in which a coating agent having water resistance is coated on or impregnated into a pulp base paper, and a synthetic resin having water resistance is coated or fused on a pulp base paper may be employed as the converted paper having water resistance. Illustratively, photographic printing paper, diazo paper and waterproof paper can be exemplified.

The water resistance of the converted paper should be 50 g/m$^2$ or less, preferably 40 g/m$^2$ or less, particularly preferably from 1 to 30 g/m$^2$, as the Cobb water absorption capacity (JIS P8140).

As the polyolefin of the polyolefin film, for example, a high density polyethylene, a medium density polyethylene and the like ethylene based resins or propylene based resins, a polymethyl-1-pentene, an ethylene-cyclic olefin copolymer and the like polyolefin resins can be employed. In addition, those in which two or more of these resins are mixed may also be employed. Among them, it is desirable to employ a high density polyethylene or a propylene based resin based on cost, water resistance, and chemical resistance.

Examples of the propylene based resin include a polypropylene, which is a propylene homopolymer and shows isotactic, syndiotactic and various stereoregularity, and a copolymer of propylene as the main component with ethylene, butene-1, hexene-1, heptene-1,4-methylpentene-1 or the like α-olefin. This copolymer may be a two dimensional system, a three dimensional system or a four dimensional system and may be a random copolymer or a block copolymer.

The polyolefin film should contain 65% by weight or less of an inorganic and/or organic fine powder.

As the inorganic fine powder, for example, calcium carbonate, calcined clay, silica, diatomaceous earth, talc, titanium dioxide, barium sulfate, alumina or the like having an average particle size of from 0.01 to 15 µm is used.

As the organic fine powder, those which have a melting point or glass transition temperature higher than the main component resin of the polyolefin film are used. Their illustrative examples include polyethylene terephthalate, polybutylene terephthalate, polycarbonate, nylon-6, nylon-6,6, a homopolymer of a cyclic olefin, a copolymer of a cyclic olefin with ethylene and the like having a melting point of from 120° C. to 300° C. or a glass transition temperature of from 120° C. to 280° C.

As the structure of the polyolefin film, it may be any of a single layer structure, a two layer structure of a base layer and a surface layer, a three layer structure in which a surface layer is present on both sides of a base layer or a multiple layer structure in which other resin film layer is present between a base layer and a surface layer, and these multiple layer structures can be produced by co-extrusion, laminating and the like known methods.

Regarding the composition of polyolefin film, it contains from 35 to 99% by weight of an olefin resin(s) and from 1 to 65% by weight of an inorganic and/or organic fine powder. Preferably, it contains from 50 to 95% by weight of an olefin resin(s) and from 5 to 50% by weight of an inorganic and/or organic fine powder.

When the polyolefin film is a multiple layer structure having a base layer and a surface layer, the base layer contains from 35 to 99% by weight of an olefin resin(s) and from 1 to 65% by weight of an inorganic and/or organic fine powder, and the surface layer contains from 25 to 100% by weight of an olefin resin(s) and from 0 to 75% by weight of an inorganic and/or organic fine powder. Preferably, the base layer contains from 50 to 97% by weight of an olefin resin(s) and from 3 to 50% by weight of an inorganic and/or organic fine powder, and the surface layer contains from 30 to 99% by weight of an olefin resin(s) and from 1 to 70% by weight of an inorganic and/or organic fine powder.

In order to obtain a relatively flexible polyolefin film, it is desirable that the content of the inorganic and/or organic fine powder in the base layer of a single layer structure or a multiple layer structure be 65% by weight or less, and the content in the surface layer be 75% by weight or less for controlling the surface strength at a more proper level.

As occasion demands, the polyolefin film may further contain a stabilizer, a photo-stabilizer, a dispersant, a lubricant and the like. For example, from 0.001 to 1% by weight of a sterically hindered phenol based, a phosphorus based, an amine based or the like stabilizer may be formulated as the stabilizer, and from 0.001 to 1% by weight of a sterically hindered amine, a benzotriazole based, a benzophenone based or the like photo-stabilizer as the photo-stabilizer, and from 0.01 to 4% by weight of a silane coupling agent, oleic acid, stearic acid or the like higher fatty acid, a metal soap or the like as the dispersant of an inorganic fine powder.

The polyolefin film used in the present invention has an electrostatic capacity of from 4 to 1,000 pF/cm$^2$.

It is desirable that the polyolefin film is formed by stretching it at least in mono-axial direction in its formation process.

As the stretching method, a known method can be employed. For example, lengthwise stretching using peripheral speed difference of rolls, transverse stretching using tenter oven and simultaneous biaxial stretching by a combination of rolling, tenter oven, linear motor and tubular method can be exemplified.

The temperature at the time of stretching is optionally selected depending on the kind of the olefin resin to be used, as well as the stretching process. Illustratively, it is desirable to maintain a temperature at a value lower than the melting point by a factor of from 2 to 60° C., e.g., from 110 to 164° C. in the case of propylene homopolymer (melting point 155 to 167° C.) and from 80 to 120° C. in the case of high density polyethylene (melting point 121 to 134° C.). The stretching speed is controlled at from 20 to 350 m/min.

The stretching magnification is not particularly limited and optionally selected depending on the purpose and characteristics of the olefin resin to be used. For example, it is preferably from 1.2 to 12 times, more preferably from 2 to 10 times, when mono-axially stretched using propylene homopolymer or a copolymer thereof, or it is preferably from 1.5 to 60 times, more preferably from 10 to 50 times, as an area magnification when biaxially stretched. It is preferably from 1.2 to 10 times, more preferably from 2 to 5 times, when mono-axially stretched using other olefin resin, or it is preferably from 1.5 to 20 times, more preferably from 4 to 12 times, as an area magnification when biaxially stretched.

Further, an annealing treatment at a high temperature is carried out as occasion demands.

As the polyolefin film containing an inorganic and/or organic fine powder, it is desirable to use a film in which micro voids (holes) are formed inside the film by stretching and which has an opacity (JIS P-8138) of 85% or more, preferably 90% or more, and a void ratio defined by the following formula (1) of from 10 to 60%, preferably from 15 to 45%.

$$\text{Void ratio (\%)} = \frac{\rho^0 - \rho}{\rho^0} \times 100 \quad \text{Formula (1)}$$

$\rho^0$: Density of film before stretching
$\rho$: Density of film after stretching Lightening of the recording paper 1 is poor when the void ratio of stretched film is less than 10%, and strengths (tensile strength and bending strength) of the recording paper 1 become low when the void ratio conversely exceeds 60%, therefore both cases are not practical.

Thickness of the polyolefin film containing an inorganic and/or organic fine powder is within the range of from 20 to 300 $\mu$m, because it is difficult to produce a stretched film having voids when it is less than 20 $\mu$m, and when it exceeds 300 $\mu$m, supply of the recording paper 1 to the market is limited to those which are cut into A3, kiku size, and similar sheet forms, packed and transported so that it becomes difficult to supply as looped roll forms.

[Recording layer]

As the recording layer 3, a synthetic resin film having water resistance and insulation ability and having a thickness of from 5 to 100 $\mu$m, preferably from 12 to 50 $\mu$m, is employed.

As the synthetic resin film having water resistance and insulation ability, it is desirable to employ a polyester film. Examples of the polyester include polyesters obtained by condensation polymerization of at least one of terephthalic acid, isophthalic acid, naphthalene dicarboxylic acid, bis-$\alpha$, $\beta$(2-chlorophenoxy)ethane-4,4'-dicarboxylic acid, adipic acid, sebacic acid and the like bifunctional carboxylic acids with at least one of ethylene glycol, triethylene glycol, tetramethylene glycol, hexamethylene glycol, decamethylene glycol and the like glycols. Among them, polyethylene terephthalate obtained by condensation polymerization of terephthalic acid with ethylene glycol is desirable.

[Coating Layer]

As the coating layer 4, for example, a layer comprising from 100 to 40% by weight of a urethane resin, a vinyl chloride-vinyl acetate copolymer, an acrylic urethane resin or a polyester polyurethane and from 0 to 60% by weight of an inorganic fine powder is employed.

The urethane resin is a urethane resin comprised of an organopolysiloxane wherein the high molecular polyol has at least two or more hydroxyl groups, and other high molecular polyol. Also, the acrylic urethane resin is disclosed in Japanese Patent Publication No. 32386/1978, Japanese Patent Publication No. 73985/1977 and the like.

As the inorganic fine powder, heavy calcium carbonate, calcined clay, titanium dioxide, barium sulfate, diatomaceous earth and the like can be used.

As the coating amount for the coating layer, it is set to from 0.5 to 20 g/m$^2$ preferably from 2 to 8 g/m$^2$, as the solid content after drying.

[Adhesive]

As the adhesive for sticking the base material layer 2 and the recording layer 3, liquid anchor coat agents such as EL-150 (trade name) mfd. by Toyo Morton or a mixture of BLS-2080A (trade name) with BLS-2080B (trade name) can be employed as a polyurethane anchor coat agent, and AD-503 (trade name) of the same company as a polyester anchor coat agent. The anchor coat agent is coated so that basis weight gets 0.5 to 25 g/m$^2$.

In addition, an ethylene-vinyl acetate copolymer, low density polyethylene, a metal salt of an ethylene- (meth) acrylic acid copolymer (so called serlin), polyethylene chloride, polypropylene chloride and the like hot melt adhesives can also be employed.

When an anchor coat agent is used, the anchor coat agent is applied to the surface of a paper material as the base material layer 2, a synthetic resin film as the recording layer 3 is subsequently superimposed and then they are bonded under pressure using a crimp roller. When a hot melt adhesive is used, it is laminated by extruding in a molted film form from a die on the surface of a paper material as the base material layer 2, a synthetic resin film as the recording layer 3 is subsequently superimposed and then they are bonded under pressure using a crimp roller.

Since the electrophotography recording paper 1 is prepared by laminating the recording layer 3 comprising a synthetic resin film having insulation ability on at least one side of the base material layer 2 comprising a paper material, and it has an electrostatic capacity of 10 pF/cm$^2$ or more, the electrostatic charge can be kept by sufficient electrification. Moreover, a toner adhered to a photoconductor drum after exposure can be efficiently transferred and adhered, so that density, color tone, and gradation recording qualities, as well as fixing property can be sharply improved.

Parallel equivalent capacity and serial equivalent capacity are included in the electrostatic capacity. In general, a measuring method for the measurement of equivalent capacity is selected depending on the measuring frequency range. An ultra low frequency bridge is used when the measuring frequency is 10 Hz or less, a transformer bridge is used when it is from 10 Hz to 3 MHz, and a parallel T type bridge, a high frequency Schering bridge, a Q meter, a resonance method, a standing wave method or a cavity resonance method is used when it exceeds 1 MHz. In addition, it can also be measured by an LCR meter, which measures voltage and current vector to circuit parts for alternating current signal of the measuring frequency and calculates the electrostatic capacity from this value.

As the measuring apparatus which measures electrostatic capacity of the recording paper, it is desirable to use a measuring apparatus in which a sample can be inserted under a constant pressure between a flat applying electrode and a flat guard electrode arranged in parallel, a voltage of about 5 V can be applied and the measuring frequency can be optionally selected. According to such a measuring apparatus, frequency-dependency of a sample can be grasped by changing the frequency and used as an index of proper using range.

It is desirable for the sample have a uniform thickness and smooth surface. When the surface condition is poor, air layers are formed between the sample and the electrodes and give a large error of the measured value. In that case, in order to effect complete electrical contact of the sample and the electrodes, it is desirable to apply a silver conductive paint or to carry out vacuum deposition.

As illustrative examples of the measuring apparatus, "LCR Meter 4274A" mfd. by Yokogawa Electric Corp., "4192A LF IMPEDANCE ANALYZER" mfd. by HEWLETT PACKARD, "HIOKI 3522 LCR High Tester" mfd. by Hioki E. E. Corp. may be cited.

In measuring electrostatic capacity of the electrophotography recording paper of the invention, the "4192A LF IMPEDANCE ANALYZER" mfd. by HEWLETT PACKARD was used. A sample larger than the electrode diameter was inserted between the applying electrode and guard electrode having a diameter of 38 mm under environmental conditions of 23° C. in temperature and 50% in relative humidity, a voltage of 5 V was applied, and the capacity was measured at frequencies within the range of from 10 Hz to 1 MHz and the measured value at a frequency of 300 Hz was used as the representative value.

Electrostatic capacity of the electrophotography recording paper of the invention is 10 pF/cm$^2$ or more, preferably from 10 to 1,000 pF/cm$^2$, more preferably from 12 to 800 pF/cm$^2$, further preferably from 15 to 300 pF/cm$^2$, per unit electrode area. When the electrostatic capacity is less than 10 pF/cm$^2$, sufficient printing concentration cannot be obtained because of the low toner transfer ratio by printing any printing mode of a printer. Also, the electrostatic capacity exceeding 1,000 pF/cm$^2$ is not desirable, because the charge applied for transferring a toner to paper in a printer remains in the recording paper at the time of paper ejection by the printer, therefore the recording paper pull each other onto the ejection tray and cause blocking.

In addition, since the electrophotography recording paper 1 is prepared by laminating the base material layer 2 comprising a paper material having water resistance and the recording layer 3 comprising a synthetic resin film having water resistance, its water resistance and durability can also be sharply improved.

Figure 2:
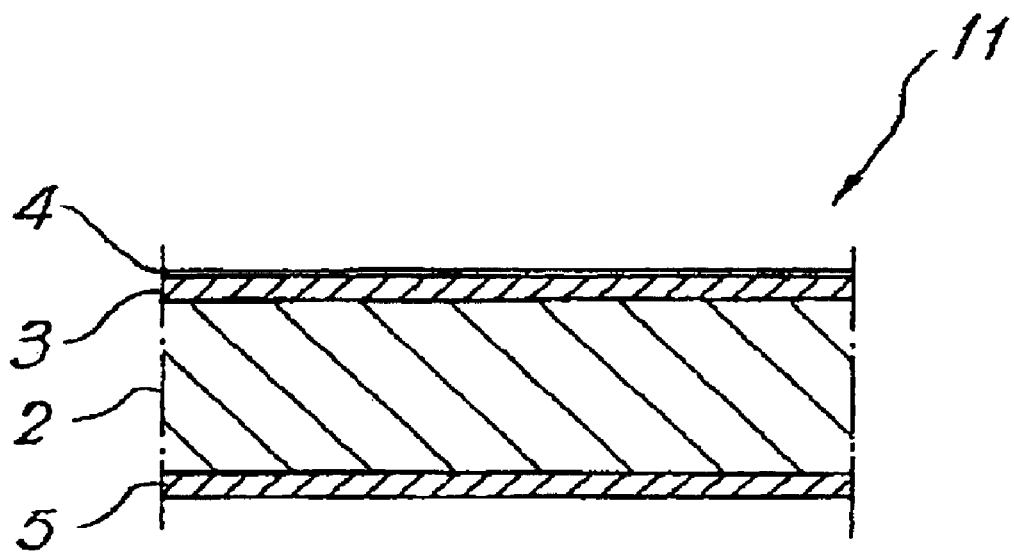
FIG. 2 is a partially expanded sectional view of another example of the electrophotography recording paper of the invention.
Figure 3:
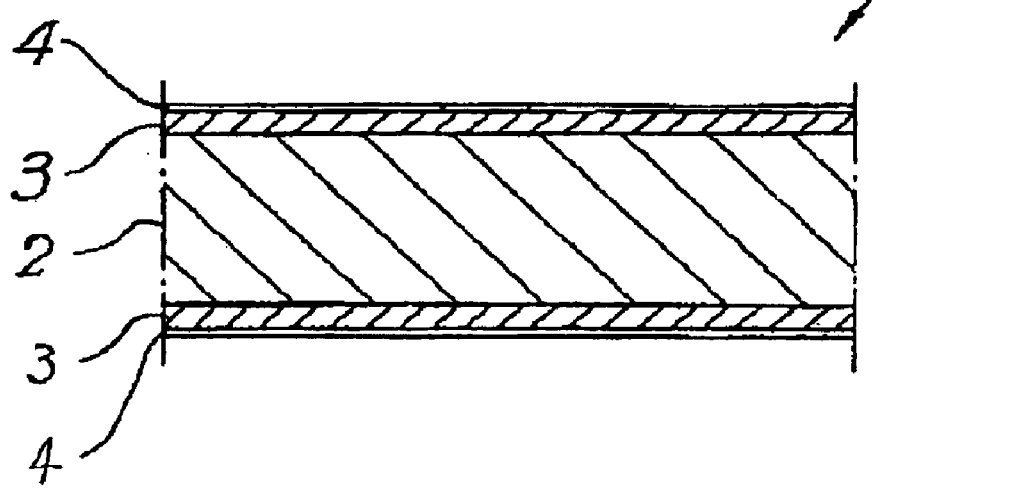
FIG. 3 is a partially expanded sectional view of another example of the electrophotography recording paper of the invention.

In the electrophotography recording paper 11 of the invention shown in FIG. 2, the recording layer 3 comprising a synthetic resin film having water resistance and insulation ability and also having the coating layer 4 is laminated on the surface of the base material layer 2 comprising a paper material having water resistance, and the protecting layer 5 comprising a synthetic resin film having water resistance and insulation ability on the reverse side thereof.

Regarding materials of the base material layer 2, recording layer 3 and coating layer 4 and the material of adhesive in the electrophotography recording paper 11, the same materials in the case of the electrophotography recording paper 1 are employed.

[Recording Apparatus]

The electrophotography recording paper of the invention can perform good color recording by an electrophotographic copying machine, a laser printer and the like.

Regarding the electrophotography recording methods, there are three methods including: (1) an intermediate transfer system in which two or more colors are transferred to an intermediate transfer unit by carrying out the intermediate transfer of colors one by one and then transfer-developed on a paper stock, (2) a tandem system in which two or more colors are separately transfer-developed on a paper stock using two or more photoconductor units, and (3) a tandem+ transfer system in which two or more colors are separately transferred to an intermediate transfer unit using two or more photoconductor units and then transfer-developed on a paper stock. Within the content of the present invention, (2) and (3) are generally referred to as tandem system.

The electrophotography recording paper of the invention can be used for the intermediate transfer system of (1), but in the case of a small machine of the system (1), its use sometimes becomes difficult when the electrophotography recording paper is stroked during its conveyed in the apparatus. The tandem systems of (2) and (3) are suitable, because they correspond to a high speed operation and, due to the structure of the apparatus, the electrophotography recording paper is rarely stroked during its conveyance.

[Protecting Layer]

As the protecting layer 5, which is comprising a synthetic resin film and arranged on the backside of the base material layer 2, a synthetic resin film having a thickness of from 5 to 100 µm, preferably from 12 to 50 µm, and having water resistance and insulation ability is employed.

The synthetic resin to be used in the protecting layer 5 is not particularly limited. For example, high density polyethylene, medium density polyethylene or the like ethylene based resin, a propylene based resin, a homopolymer of polymethyl-1-pentene or the like α-olefin having from 2 to 8 carbon atoms, an olefin resin such as an ethylene-cyclic olefin copolymer or the like copolymer of 2 to 5 α-olefins; nylon-6, nylon-6,6, nylon-6,10, nylon-6,12 or the like polyamide resin; polyethylene terephthalate or a copolymer thereof, polyethylene naphthalate, an aliphatic polyester or the like thermoplastic polyester resin, a polycarbonate; an atactic polystyrene, a syndiotactic polystyrene or the like polystyrene resin; a polyphenylene sulfide and the like can be used. Also, two or more of them may be mixed and used.

In constructing the electrophotography recording paper 11, when the anchor coat agent is used, the anchor coat agent is applied to the surface and backside of a paper material as the base material layer 2, a synthetic resin film as the recording layer 3 is subsequently superimposed on the surface, and a synthetic resin film as the protecting layer 5 on the backside, and then they are bonded under pressure using a crimp roller. When the hot melt adhesive is used, it is laminated by extruding in a molted film form from a die on the surface and backside of a paper material as the base material layer 2, a synthetic resin film as the recording layer 3 is subsequently superimposed on the surface, and a synthetic resin film as the protecting layer 5 on the backside, and then they are bonded under pressure using a crimp roller.

Thickness of the electrophotography recording paper of the invention is generally from 70 to 500 µm, preferably from 75 to 400 µm and more preferably from 80 to 300 µm. Also, its basis weight is generally from 70 to 500 g/m$^2$, preferably from 75 to 400 g/m$^2$ and more preferably from 80 to 300 g/m$^2$.

Since the electrophotography recording paper 11 of the invention is prepared by laminating the recording layer 3 and protecting layer 5 comprising a synthetic resin film having insulation ability on the surface and backside of the base material layer 2 comprising a paper material, similar to the case of the electrophotography recording paper 1, the electrostatic charge can be maintained by sufficient electrification and a toner adhered to a photoconductor drum after exposure can be efficiently transferred and adhered, so that density, color tone, and gradation recording qualities and the fixing properties can be sharply improved.

The electrophotography recording paper of the invention can also be treated with usual printing (e.g., offset, UV offset, gravure, flexo graphic printing or the like) before carrying out recording using the recording apparatus. As occasion demands, a bar code for control use may be printed by these printings or a heat transfer system or an electrophotography system.

Also, in order to improve sales promotion and visibility of the electrophotography recording paper of the invention, overall printing or partial printing may be applied to the backside (opposite face of the coating layer side) of the synthetic film which becomes the recording layer, before laminating with the base material layer, or overall printing or partial printing may be applied to a side of the base material layer where the recording layer is to be laminated, before laminating with the recording layer.

In addition, a synthetic resin film may be laminated on the surface and/or the back of the basic material layer composed of pulp paper, followed by laminating the recording layer 5 on the synthetic resin film.

[Pressure-Sensitive Adhesive Layer]

The electrophotography recording paper of the invention may have a pressure-sensitive adhesive layer on one side of the outermost layer of the electrophotography recording paper by applying a pressure-sensitive adhesion processing. Kind and thickness (coating amount) of the pressure-sensitive adhesive layer can be selected in various way depending on the kind of the substance to be adhered, environment to be used, desirable adhesion strength and the like.

The pressure-sensitive adhesive layer can be formed by coating and drying a generally used pressure-sensitive adhesive of an aqueous system or solvent system. As the pressure-sensitive adhesive, a synthetic polymer pressure-sensitive adhesive agent of a natural gum based, a synthetic gum based, an acrylic based or the like can be used. The pressure-sensitive adhesive can be used as an organic solvent or a dispersion, emulsion or the like form in which it is dispersed in water. Also, in order to improve opacity of the electrophotography recording paper, it is possible to contain titanium dioxide or the like pigment in the pressure-sensitive adhesive.

The pressure-sensitive adhesive layer can be formed by coating it in a solution state on the silicon treating side of a release paper. As occasion demands, the pressure-sensitive adhesive layer may be formed by directly coating on the electrophotography recording paper.

The coating is carried out roll coater, blade coater, bar coater, air knife coater, gravure coater, reverse coater, die coater, lip coater, spray coater or the like, and the pressure-sensitive adhesive layer is formed via smoothing and drying process as occasion demands.

Thickness of the pressure-sensitive adhesive layer can be selected in various way in response to the use object of labels, but is generally from 2 to 30 $\mu$m, preferably from 5 to 20 $\mu$m.

The electrophotography recording paper of the invention may have a release paper on the surface of the pressure-sensitive adhesive layer. As the release paper, a general paper can be used. For example, wood free paper or kraft paper as such or after its calender treatment, resin coating or film laminating, or glassine paper, coat paper, plastic film or the like treated with silicon can be used. In order to improve releasing ability from the pressure-sensitive adhesive layer in sticking and using the electrophotography recording paper, it is general to apply silicon treatment to a side of the release paper where it contacts with the pressure-sensitive adhesive layer.

[Perforation]

The electrophotography recording paper of the present invention can be perforated if required The perforation is performed using a heated needle, an electron beam, a laser beam, or a punch with a rotary blade or a trimming die to form a line of perforations in which the longest length of a cut portion is in the range of 0.1 to 10 mm, preferably 0.2 to 8 mm, and the length of an uncut portion is in the range of 0.1 to 1 mm, preferably 0.2 to 0.8 mm. If the length of the cut portion of the perforation is too short or the length of the uncut portion is too long, it is difficult to tear off along the line of perforations. On the other hand, if the length of the cut portion of the perforation is too long or the length of the uncut portion is too short, troubles such as buckling and breaking tend to be occurred at the time of handling the recording paper. The electrophotography recording paper of the present invention can be perforated and/or punched before printing. Such processing does not generate buckling and breaking in the printing process, while providing the paper with a good hand-cutting property after the printing.

Furthermore, a good folding suitability can be obtained by half-cutting in a thickness direction at the time of perforating and/or punching. Alternatively, the good folding suitability may be obtained by forming a pressed crease with a pressing process.

EXAMPLES

The following examples further illustrate the present invention to provide the artisan with a better understanding.

In this connection, the materials, using amounts, ratios, treating contents and treating procedures shown in the following examples can be optionally changed with the proviso that they do not depart from the object of the invention. Accordingly, the scope of the invention is not limited to the illustrative examples shown below.

Production Examples of Recording Paper (Production Example of Synthetic Paper)

A composition (a), prepared by mixing 81% by weight of polypropylene (melting point, about 164 to 167° C.) having a melt flow rate (MFR) of 0.8 g/10 minutes with 3% by weight of high density polyethylene and 16% by weight of calcium carbonate having an average particle size of 1.5 $\mu$m, was kneaded with an extruder set to a temperature of 270° C., and then extruded in a sheet form and further cooled with a cooling apparatus to obtain a non-stretched sheet. Thereafter, this sheet was again heated at a temperature of 150° C. and subjected to stretching 5 times in the lengthwise direction to obtain a 5 times lengthwise-stretched film.

A composition (b), prepared by mixing 54% by weight of polypropylene (melting point, about 164 to 167° C.) having a melt flow rate (MFR) of 4 g/10 minutes with 46% by weight of calcium carbonate having an average particle size of 1.5 $\mu$m, was kneaded at 210° C. with another extruder and extruded in a sheet to form a die. This was laminated on both sides of the 5 times lengthwise-stretched film obtained by the above step to obtain a three layer structure laminate film.

Next, the three layer structure laminate film was cooled to a temperature of 60° C., again heated to a temperature of about 155° C., stretched 7.5 times in the transverse direction using a tenter, subjected to an annealing treatment at a temperature of 165° C. and subsequently cooled to a temperature of 60° C. The side-edges were slit, thereby obtaining a synthetic paper having an opacity of 87%, a void ratio of 31%, a density of 0.79 g/cm$^3$, a Clark stiffness (S value) of 13 in the lengthwise direction and 23 in the transverse direction and an electrostatic capacity of 9 pF/m$^2$, as a laminate film of a three layer structure (mono-axial stretching/bi-axial stretching/mono-axial stretching) having a thickness of 80 $\mu$m (b/a/b=10 $\mu$m/60 $\mu$m/ 10 $\mu$m.

(Production Example of Coating Solution)

A three neck flask equipped with a stirrer, a reflux condenser and a thermometer was charged with 15 parts of 2-hydroxyethyl methacrylate, 50 parts of methyl methacrylate, 35 parts of ethyl acrylate and 100 parts of toluene and, after replacing the atmosphere with nitrogen, the polymerization was carried out at 80° C. for 4 hours using 0.6 part of 2,2'-azobisisobutyronitrile as the initiator. The solution obtained thereby was a 50% toluene solution of a hydroxyl group-containing methacrylic acid ester polymer with a hydroxyl value of 65.

Next, 100 parts by weight of this solution was formulated with 20 parts by weight of a vinyl chloride-vinyl acetate copolymer (mfd. by Shin Daiichi Enbi: ZEST C150ML), 20% methyl ethyl ketone solution and a hexamethylene diisocyanate (mfd. by Nippon Polyurethane Industry: Colonate HL), 75% ethylacetate solution, 20 parts by weight of a silanol group-containing polyvinyl alcohol copolymer (mfd. by KURARAY: R-1130, polymerization degree 1700) aqueous solution, and 20 parts by weight of heavy calcium carbonate powder (mfd. by Shiraishi Calcium) having an average particle size of 1.5 $\mu$m. By adding butyl acetate to this mixture to adjust the solid content to 35%, a coating solution was obtained.

Inventive Example 1

The coating solution obtained in (Production example of coating solution) was applied on the surface of a polyethylene terephthalate film (manufactured by Toray) having a thickness of 25 $\mu$m (trade name: Lumirror) in such an amount that the dry solid content became 1 g/m$^2$, and then hardened at 80° C. for 1 hour to form the recording layer 3 having the coating layer 4.

An OTP base paper for printing paper use (basis weight 175 g/m$^2$) manufactured by Oji Paper having a Cobb water absorption capacity of 24.8 g/m$^2$ was used as the base material layer 2, and 4 g/m$^2$(ratio of the solid content) of an adhesive comprising a mixture of polyurethane based anchor coat agents "BLS-2080A" and "BLS-2080B" manufactured by Toyo Morton was applied to both sides of the layer.

Next, the recording layer 3 was superimposed on the surface side of the base material layer 2 in such a manner that the coating layer 4 became outside, and a polyethylene terephthalate film manufactured by Teijin Du Pont Films (trade name: Melinex 377) having a thickness of 19 $\mu$m was superimposed as the protecting layer 5 on the backside of the base material layer 2, and then they were pasted using a crimp roller, thereby obtaining the electrophotography recording paper 11 having a construction in which the coating layer/polyethylene terephthalate film/converted paper/polyethylene terephthalate film were laminated and having a thickness of 220 $\mu$m and an electrostatic capacity of 26 pF/m$^2$.

Inventive Example 2

The electrophotography recording paper 11 having a construction in which the coating layer/polyethylene terephthalate film/converted paper/polypropylene film were laminated and having a thickness of 220 $\mu$m and an electrostatic capacity of 15 pF/m$^2$ was obtained in the same manner as in Inventive Example 1, except that the polyethylene terephthalate film of protecting layer 5 in Inventive Example 1 was changed to a biaxially stretched polypropylene film manufactured by Toray (trade name: Torayfan BO YM11) having a thickness of 20

Inventive Example 3

The electrophotography recording paper 11 having a construction in which the coating layer/polyethylene terephthalate film/converted paper/polyethylene terephthalate film were laminated and having a thickness of 126 $\mu$m and an electrostatic capacity of 18 pF/m$^2$ was obtained in the same manner as in Inventive Example 1, except that the converted paper of base material layer 2 in Inventive Example 1 was changed to the synthetic paper obtained in (Production example of synthetic paper).

Inventive Example 4

The electrophotography recording paper 1 having a construction in which the coating layer/polyethylene terephthalate film/converted paper were laminated and having a thickness of 195 $\mu$m and an electrostatic capacity of 37 pF/m$^2$ was obtained in the same manner as in Inventive Example 1, except that the protecting layer 5 was not formed.

Inventive Example 5

In Example 1, the recording layer 3 was laminated on the back of the basic material layer 2 such that the coating layer is located on the outside. Consequently, an electrophotography recording paper 111 having a construction in which the coating layer/polyethylene terephthalate film/converted paper/polyethylene terephthalate film/coating layer were laminated and having a thickness of 327 $\mu$m and an electrostatic capacity of 22 pF/m$^2$ was obtained.

Comparative Example 1

An electrophotography recording paper having a construction in which the coating layer/polyethylene terephthalate film/wood free paper/polyethylene terephthalate film were laminated and having a thickness of 130 $\mu$m and an electrostatic capacity of 19 pF/m$^2$ was obtained in the same manner as in Inventive Example 1, except that the converted paper of base material layer 2 in Inventive Example 1 was changed to a wood free paper (basis weight 64 g/m$^2$).

Comparative Example 2

An electrophotography recording paper having a construction in which the coating layer/polypropylene film/converted paper/polypropylene film were laminated and having a thickness of 215 $\mu$m and an electrostatic capacity of 8 pF/m$^2$ was obtained in the same manner as in Inventive Example 2, except that the polyethylene terephthalate film of recording layer 3 in Inventive Example 2 was changed to a biaxially stretched polypropylene film manufactured by Futamura Chemical Industries (trade name: Taiko FOR-BT) having a thickness of 25 $\mu$m.

Comparative Example 3

The waterproof paper of Inventive Example 1 was used. It had a thickness of 175 $\mu$m, and an electrostatic capacity of 40 pF/m$^2$.

Evaluation Methods and Results (Evaluation of Recording Qualities)

Using a tandem system color laser printer N4-612II (trade name) manufactured by CASIO, a test image recording on the recording layer of the electrophotography recording paper was performed using four color toners of yellow, cyan, magenta and black. Density, color tone, and gradation were judged with the naked eye based on the following evaluation criteria.

○: All of the density, color tone and gradation are good.
Δ: The printing density is slightly low.
X: Either of the density, color tone and gradation is poor and cannot stand its use.

(Evaluation of Water Resistance)

In addition, the thus recorded recording paper was soaked in still water for 10 minutes and then dried, and remaining condition of the recording paper and generation condition of wrinkles on the printing paper were judged with the naked eye by the following evaluation criteria.

○: No generation of wrinkles on the recording paper, and all of the density, color tone and gradation are good.

Δ: Generation of wrinkles on the recording paper, which is practically problematic.

X: Generation of wrinkles on the recording paper, which cannot stand its use.

(Evaluation of Hand-Cutting Property)

The obtained electrophotography recording paper was subjected to perforation using a punching blade having a non-cut pitch of 0.15 μm and a cut pitch of 0.35 μm. Ease of cutting was evaluated with the following evaluation criteria.

⊙: It can be easily cut off by bending twice in the thickness direction and little burrs can be seen in the end face.

○: It cannot be cut off by bending twice in the thickness direction. However, it can be cut off along the line of perforations and little burrs can be seen in the end face.

X: It can be cut off along the line of perforations, while many burrs can be seen in the end face.

TABLE 1

| | Thickness ($\mu m$) | Electrostatic capacity ($pF/cm^2$) | Cobb water absorbency ($g/m^2$) | Recording qualities | Water resistance | Hand-cutting property |
|---|---|---|---|---|---|---|
| Inv. Ex. 1 | 220 | 26 | 24.8 | ○ | ○ | ⊙ |
| Inv. Ex. 2 | 220 | 15 | 24.8 | ○ | ○ | ○ |
| Inv. Ex. 3 | 126 | 18 | 5.0 | ○ | ○ | ⊙ |
| Inv. Ex. 4 | 195 | 37 | 24.8 | ○ | ○ | ○ |
| Inv. Ex. 5 | 327 | 22 | 24.8 | ○ | ○ | ⊙ |
| Comp. Ex. 1 | 130 | 19 | 80.0 | ○ | X | ○ |
| Comp. Ex. 2 | 215 | 8 | 24.8 | Δ | ○ | ○ |
| Comp. Ex. 3 | 175 | 40 | 24.8 | ○ | ○ | X |

Results of the evaluations are as shown in Table 1. From these results it can be understood that the electrophotography recording paper of the present invention is excellent in density, color tone, and gradation recording qualities and is also excellent in fixing property, water resistance, and durability.

INDUSTRIAL APPLICABILITY

It is possible to use the recorded matter of the invention as POP cards (poster, sticker, display and the like), pads (lunch mat, table mat, for stationary use and the like), manuals (various manuals for duty, work, operation and the like, operation sheet, time table and the like), charts (nautical chart, weather chart, graphic chart, ruled line chart and the like), catalogs, cards (price card, point card, members card, various membership certificates, student's identification card, license card, stuff's identification card, written permission for coming and going, union card, identification card, student's attendance card, books card, consulation ticket, management card, parting permit, ticket book for skiing, CD and MD title cards, CD and MD index cards, photo card and the like), panels, plate (substitute for metal plate) stills, preserve documents (word processor document, various lists, opinion in writing, certificate, important documents, diploma of honor and the like), picture books, drawings (construction drawing, engineering site drawing and the like), maps (nautical chart, route map, exterior map and the like), communication tickets, shop price tables, mountaineering guides, business cards, child's tags, cooking recipes, information boards (counter information, information for direction and destination, information for confectionery and food and the like), POP for horticultural use (insertion label and the like), schedule tables, road signs (for funeral, house exhibiting place and the like), circulating bulletins, room name tags, campus recording tables, exhibition boards (of off limits, forest road works and the like), compartment pits, name plates, calendars (with images), handy white boards, postal cards, greeting cards, leaflets, picture books and picture story shows, portable time tables, album picture diaries, paper constructions (paper crafts), copy manuscripts, fans, megaphones, mouse pads, bookmarks, toilets for pet use, packing materials (wrapping paper, box, bag and the like), coasters, menus, flowerpots, laminate-needless printed matter, substitution printed matter for label writing, pressure-sensitive adhesive labels and the like.

What is claimed is:

1. An electrophotography recording paper comprising a laminate of: a base material layer comprising a paper material having water resistance and selected from the group consisting of (1) converted papers having a Cobb water absorption capacity of 50 g/m² or less, (2) polyolefin-based single layer films, and (3) polyolefin-based single and multi-layer films; and a recording layer comprising a synthetic resin film with a coating layer thereon, the recording layer provided on at least one side of the base material, wherein the electrophotography recording paper has an electrostatic capacity of 10 pF/cm² or more.

2. The electrophotography recording paper described in claim 1, wherein a printing has been applied in advance to the side of the recording layer opposing the coating layer.

3. The electrophotography recording paper described in claim 1, wherein a printing has been applied in advance to the side of the base material layer to be laminated with the recording layer.

4. The electrophotography recording paper described in claim 1, wherein the paper material is a converted paper.

5. The electrophotography recording paper described in claim 1, wherein the paper material is a polyolefin film containing an inorganic and/or organic fine powder.

6. The electrophotography recording paper described in claim 1, wherein the synthetic resin film is a polyester film.

7. The electrophotography recording paper described in claim 6, wherein the polyester film is a polyethylene terephthalate film.

8. The electrophotography recording paper described in claim 1, wherein a bar code is printed on the coating layer of the recording layer.

9. An electrophotography recording paper prepared by applying a pressure-sensitive adhesion processing to one side of the outermost layer of the electrophotography recording paper described in claim 1.

10. A recorded matter prepared by using the electrophotography recording paper described in claim 1.

11. A label prepared by using the recorded matter described in claim 10.

12. An electrophotography recording paper, wherein perforations are formed on the electrophotography recording paper described in claim 1.

13. An electrophotography recording paper comprising a laminate of: a base material layer comprising a paper material having water resistance and selected from the group consisting of (1) converted papers having a Cobb water absorption capacity of 50 g/m² or less, (2) polyolefin-based single layer films, and (3) polyolefin-based multi-layer films; a recording layer comprising a synthetic resin film with a coating layer thereon, the recording layer provided on a surface of the base material layer; and a protecting layer comprising a synthetic resin film on the reverse side of the base material layer, wherein the electrophotography recording paper has an electrostatic capacity of 10 pF/cm² or more.

14. The electrophotography recording paper described in claim 13, wherein a printing has been applied in advance to the side of the recording layer opposing the coating layer.

15. The electrophotography recording paper described in claim 13, wherein a printing has been applied in advance to the side of the base material layer to be laminated with the recording layer.

16. The electrophotography recording paper described in claim 13, wherein the paper material is a converted paper.

17. The electrophotography recording paper described in claim 13, wherein the paper material is a polyolefin film containing an inorganic and/or organic fine powder.

18. The electrophotography recording paper described in claim 13, wherein the synthetic resin film of the recording layer is a polyester film.

19. The electrophotography recording paper described in claim 18, wherein the polyester film is a polyethylene terephthalate film.

20. The electrophotography recording paper described in claim 13, wherein the synthetic resin film of the protecting layer is a film comprising at least one resin selected from an olefin resin, a polyamide resin, a thermoplastic polyester resin, a polycarbonate, a polystyrene resin, and a polyphenylene sulfide.

21. The electrophotography recording paper described in claim 13, wherein a bar code is printed on the coating layer of the recording layer.

22. An electrophotography recording paper prepared by applying a pressure-sensitive adhesion processing to one side of the outermost layer of the electrophotography recording paper described in claim 13.

23. A recorded matter prepared by using the electrophotography recording paper described in claim 13.

24. A label prepared by using the recorded matter described in claim 23.

25. An electrophotography recording paper, wherein perforations are formed on the electrophotography recording paper described in claim 13.

26. A process comprising electrophotographic recording on the electrophotography recording paper described in claim 1.

27. The process described in claim 26, which is carried out by an electrophotographic copying machine.

28. The process as described in claim 26, which is carried out by a laser printer.

29. The process as described in claim 26, wherein the electrophotographic recording is carried out by an intermediate transfer system.

30. The process as described in claim 26, wherein the electrophotographic recording is carried out by a tandem system.

31. The process as described in claim 26, wherein the electrophotographic recording is carried out by a tandem+ transfer system.

32. A process comprising electrophotographic recording on the electrophotography recording paper described in claim 13.

33. The process described in claim 32, which is carried out by an electrophotographic copying machine.

34. The process as described in claim 32, which is carried out by a laser printer.

35. The process as described in claim 32, wherein the electrophotographic recording is carried out by an intermediate transfer system.

36. The process as described in claim 32, wherein the electrophotographic recording is carried out by a tandem system.

37. The process as described in claim 32, wherein the electrophotographic recording is carried out by a tandem+ transfer system.

* * * * *